United States Patent
Sastry et al.

(10) Patent No.: US 7,962,555 B2
(45) Date of Patent: Jun. 14, 2011

(54) ADVANCED DISCUSSION THREAD MANAGEMENT USING A TAG-BASED CATEGORIZATION SYSTEM

(75) Inventors: Nishanth R. Sastry, Concord, MA (US); Alexander Kordun, Arlington, MA (US)

(73) Assignee: International Business Machines Corporation, Armonk, NY (US)

( * ) Notice: Subject to any disclaimer, the term of this patent is extended or adjusted under 35 U.S.C. 154(b) by 753 days.

(21) Appl. No.: 11/537,074

(22) Filed: Sep. 29, 2006

(65) Prior Publication Data
US 2008/0082607 A1   Apr. 3, 2008

(51) Int. Cl.
*G06F 15/16* (2006.01)
(52) U.S. Cl. ............... 709/206; 707/600; 709/204
(58) Field of Classification Search ............... 709/206
See application file for complete search history.

(56) References Cited

U.S. PATENT DOCUMENTS

| | | | |
|---|---|---|---|
| 5,778,363 A | 7/1998 | Light | |
| 6,219,691 B1 | 4/2001 | Youn | |
| 6,405,226 B1 * | 6/2002 | Alpert et al. | 715/206 |
| 6,438,580 B1 | 8/2002 | Mears et al. | |
| 6,571,234 B1 | 5/2003 | Knight et al. | |
| 6,598,046 B1 * | 7/2003 | Goldberg et al. | 707/5 |
| 7,024,462 B1 | 4/2006 | McErlean | |
| 7,035,903 B1 | 4/2006 | Baldonado | |
| 2003/0014482 A1 * | 1/2003 | Toyota et al. | 709/203 |
| 2004/0083127 A1 | 4/2004 | Lunsford et al. | |
| 2004/0111478 A1 * | 6/2004 | Gross et al. | 709/206 |
| 2005/0160166 A1 | 7/2005 | Kraenzel | |
| 2005/0198128 A1 * | 9/2005 | Anderson et al. | 709/204 |
| 2005/0235034 A1 | 10/2005 | Chen et al. | |
| 2005/0262199 A1 | 11/2005 | Chen et al. | |
| 2006/0026593 A1 | 2/2006 | Canning et al. | |
| 2006/0095285 A1 * | 5/2006 | Sol et al. | 705/1 |
| 2007/0022110 A1 * | 1/2007 | Suda et al. | 707/5 |
| 2007/0208703 A1 * | 9/2007 | Shi et al. | 707/3 |
| 2007/0226205 A1 * | 9/2007 | Carrer et al. | 707/5 |
| 2008/0016072 A1 * | 1/2008 | Frieden et al. | 707/7 |
| 2008/0016098 A1 * | 1/2008 | Frieden et al. | 707/102 |
| 2008/0046394 A1 * | 2/2008 | Zhou et al. | 706/52 |

OTHER PUBLICATIONS http://techrepublic.com.com/5255-6257-0.html?month=6&year=2005&forumID=99&threadID=173893&id=1383826 "See discussion of TagSurf within Global tagging continues apace".

* cited by examiner

*Primary Examiner* — Firmin Backer
*Assistant Examiner* — Hamza Algibhah
(74) *Attorney, Agent, or Firm* — David A. Dagg (57) ABSTRACT

A system for discussion thread management using tag-based categorization, in which three types of tags are provided together to enable effective categorization of discussion threads, based on both automated and manual tagging. The three tag types are 1) user-defined tags, 2) moderator-promoted tags, and 3) system-generated tags. User-defined tags are arbitrarily defined by individual users and associated by users with posts to meet specific user needs. System-generated tags are automatically generated for each sub-thread to summarize a post and all the replies beneath it. System-generated tags can be promoted to a moderator-promoted tags when a moderator user verifies the correctness of a system-generated tag. The disclosed system detects topic changes in discussion threads based on the tags associated with each post in the thread. A moderator can manually examine sub-threads that have been determined to be off topic, and take appropriate actions. For example, a moderator may delete an off topic post or sub-thread, or fork a new thread of discussion for an off-topic sub-thread. Such processing of off-topic sub-threads can alternatively be made by the disclosed system automatically, without moderator intervention. Moderators can also define policies to control discussion moderation based on the disclosed tags and off-topic determinations.

15 Claims, 7 Drawing Sheets

| Post | Tags (ranked L-to-R) | Conj. Score |
|---|---|---|
| T, T | DB2, CS | 13 |
| $R_4$ | CS, DB2 | 12 |
| $R_6$ | DB2, Ruby, CS | 9 |
| $R_5$ | DB2 | 7 |
| $R_3$ | DB2, Django, Ruby | 4 |
| $R_2$ | Django, Ruby, DB2 | -4 |
| $R_1$ | Django, Ruby | -40 |

*FIG. 9*

ADVANCED DISCUSSION THREAD MANAGEMENT USING A TAG-BASED CATEGORIZATION SYSTEM

FIELD OF THE INVENTION

The present invention relates generally to the field of groupware and messaging software, and more specifically to a method and system for advanced discussion thread management using a tag-based categorization system.

BACKGROUND OF THE INVENTION

Various existing on-line services allow users to access and/or enter or send various specific types of messages, typically through one or more shared server systems. Such messages, referred to herein as "posts", may contain various specific types of user content, such as text, graphics, or sound and/or video clips, and are logically organized into discussion "threads". Each discussion thread includes a root post referred to herein as the "topic" post, and one or more "reply" posts presented in reverse chronological order beneath the topic. Examples of existing services providing discussion threads include on-line forums, such as newsgroups, conferences, and blogs.

A discussion thread is organized as a logical tree structure, and accordingly may include one or more sub-threads, each based on a root "topic" consisting of a reply within the higher level thread. Sub-threads may also sometimes be referred to as "branches" within the logical tree structure of a discussion thread.

Those skilled in the art will recognize "posts" are sometimes referred to by other names, such as "entries", "messages", etc., and that "post" refers generally to any specific type of message within a discussion thread. Similarly, "topics" are sometimes known by other names, such as "articles", and "replies" are sometimes known by other names such as "comments". Accordingly the terms "topic" and "reply" are also intended herein to be understood generally.

Problems with existing systems result from the fact that discussion threads tend to become voluminous, with multiple users posting short, spontaneous comments that often have little value. Furthermore, new visitors to a thread, and/or visitors to a thread that is no longer active, may find it difficult to quickly read through the thread without prior knowledge of its overall context.

Some existing systems have introduced tags to help solve these problems. Tags are category names that can be associated with posts. Tags enable users of some existing systems to view posts that are interesting to them, based on the tags associated with those posts. Some existing systems have provided users with the ability to tag posts. For example, Slashdot (www.slashdot.com) allows users to select tags from a fixed set of pre-defined tags. The system defined, fixed tag set of Slashdot includes tags such as "insightful", "funny", "irrelevant", etc. Users can cause the system to display only those posts marked as "funny", or "insightful", etc., depending on their individual needs, and exclude from display those posts marked as "irrelevant". Similarly, in the Microsoft® TechNet forums, the author of a post can mark that post as a question or an answer. As a result, expert users trawling a forum can cause it to display only posts tagged as questions, while novices facing problems might only look for posts that are tagged as answers.

Unfortunately, existing solutions are too limited in their operation. For example, previous approaches do not sufficiently address the needs of users visiting a discussion thread that has been inactive for a significant time. Such users are likely to be interested in retrieving posts based on the subjects addressed by the posts; fixed tags such as "funny" or "insightful" are not useful for this kind of post retrieval. Additionally, these existing systems require that tags be added manually on to specific, individual posts either by users or moderators, without automated aid from the system.

Administrator users of discussion forums also need better tag-based moderation tools and functions than are provided by existing systems. User participation in forums is directly correlated to how useful, up-to-date, and on-topic people perceive a particular discussion to be. Even if most posts are "on-topic", the actual subject of a discussion could change as a thread evolves. For large discussions, administrators need a faster way to determine when threads get out of control and need to be moderated to stick to the original topic. Currently, administrators have to either perform simple searches for keywords to detect misuse, read each individual post in the discussion, and/or respond to user feedback messages and complaints. Clearly these solutions are insufficient and not reliable, and may quickly result in people simply not participating in active forums because they fear that their opinions will be lost in the noise of irrelevant posts.

For the above reasons and others it would be desirable to have a new system for discussion thread management. The new system should enable new users to effectively use large discussion forums, and allow the effective use of discussion forums that have been dormant for a significant time. The new system should also assist administrator users manage large discussion threads to control off-topic sub-threads and irrelevant conversations.

SUMMARY OF THE INVENTION

To address the above described and other shortcomings of existing systems, a new method and system for advanced discussion thread management using tag-based categorization is disclosed. In the disclosed system, three types of tags are provided together to enable effective categorization of discussion threads. The disclosed system enables arbitrary, dynamically determined tags to be added to a discussion thread. The tags in the disclosed system are of three different types, based on how they are defined. The three tag types are 1) user-defined tags, 2) moderator-promoted tags, and 3) system-generated tags. User-defined tags are arbitrarily defined by individual users and associated by users with posts to meet specific user needs. The user-defined tags are not pre-determined or set by the system, and users are free to decide the contents, such as text, contained in each user-defined tag. System-generated tags are automatically generated for each sub-thread that summarize the posts within the sub-thread. A system-generated tag can be promoted to a moderator-promoted tag when a moderator user verifies the correctness of the system-generated tag.

The disclosed system also automatically detects topic changes in discussion threads (and subthreads) based on the above described tags. A moderator of a forum can accordingly turn on "off-topic post" detection, which determines whether a given sub-thread is tagged sufficiently differently from the topic of the parent thread. If so, then the sub-thread is determined to be off-topic. The moderator can manually examine sub-threads that have been determined to be off topic, and take appropriate actions. For example, a moderator may delete an off topic thread, or fork a new thread of discussion for the off-topic sub-thread. In another embodiment, such decisions as to whether an off-topic sub-thread should be moved or deleted are made automatically, without moderator intervention.

The disclosed system may be embodied to enable moderators to define policies for discussion moderation based on the disclosed tags and off-topic determinations. In one embodiment, for purposes of efficiency, a policy setting enables the moderator to specify a minimum number of posts that a sub-thread must contain for that sub-thread to be considered for the disclosed automatic off-topic determination. For example, responsive to a policy setting indicated by a moderator of a forum, the disclosed system can for example suggest which sub-threads represent conversations bordering on "irrelevant", and allow the moderator to intervene by deleting the sub-threads or moving them into their own separate topics. Such moving or deleting may alternatively be provided such that it is performed automatically, without moderator involvement. When an off-topic sub-thread is removed from a discussion thread, a link to its new location may be left within the discussion thread from which it was removed. These moderator-initiated, and/or policy controlled automatic actions taken with regard to off-topic sub-threads can be transparent to users participating in the discussion thread. Alternatively, users can be automatically notified when a sub-thread has been removed from a discussion thread and placed under a separate topic.

The disclosed system advantageously combines a flexible tool for allowing user-defined tags with automatic tag definition based on the contents of complete sub-threads. The three tag types in the disclosed system improve overall tag accuracy, and enable moderators to efficiently provide tag coverage for large discussion threads in which many conversations may be going on at the same time.

The disclosed system is further advantageous in that users involved in an off-topic sub-thread can still find a previously moved sub-thread based on a link to the new topic that is automatically inserted into the main discussion thread when the off-topic sub-thread is moved. Other interested participants are made aware of these off-topic conversations as a result of the automatically inserted links in the main discussion thread, and can choose to join them if they wish. The main discussion is kept on topic, and subject clutter is dramatically reduced by the disclosed system, while sparing moderators countless hours reading peoples' irrelevant flames, tangential discussions, and figuring out how to stop or move them.

Thus there is disclosed a new system for discussion thread management, which enables new users to effectively use large discussion forums, including discussion threads that have been dormant for a significant time. The disclosed system also helps administrator users efficiently manage large discussion threads to control off-topic sub-threads and irrelevant conversations.

BRIEF DESCRIPTION OF THE DRAWINGS

The subject matter regarded as the invention is particularly pointed out and distinctly claimed in the concluding portion of the specification. The invention, both as to organization and method of operation, together with objects, features, and advantages thereof, may best be understood by reference to the following detailed description when read with the accompanying drawings in which:

DETAILED DESCRIPTION OF EXEMPLARY EMBODIMENTS

Figure 1:
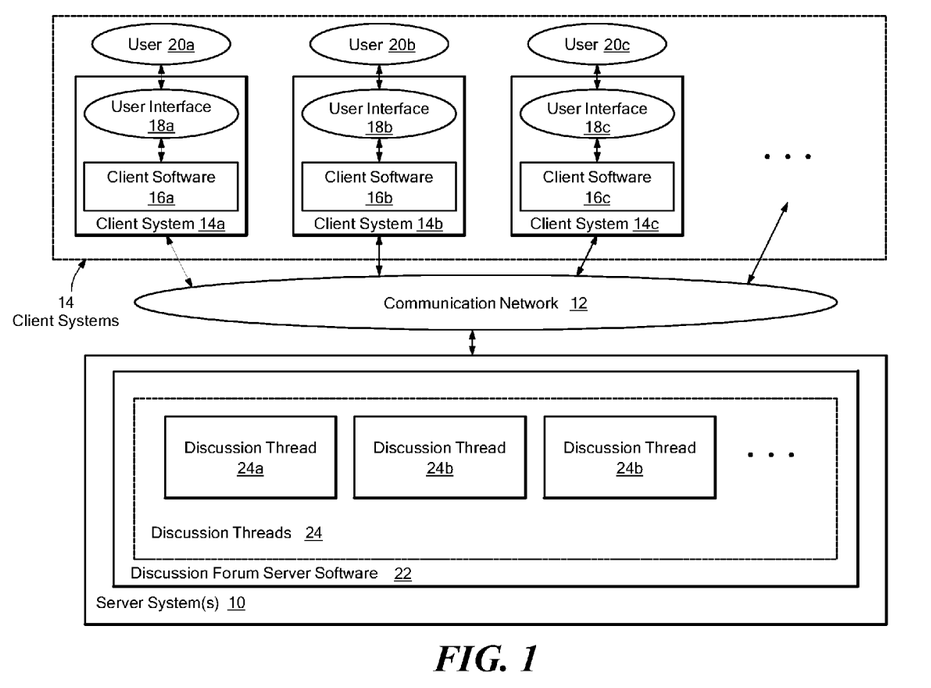
FIG. 1 is a block diagram showing the structure and operation of software and hardware components in an illustrative embodiment of the disclosed system in a computer network.

As shown in FIG. 1, components in which an illustrative embodiment of the disclosed system operates include a server system 10 that is communicably connected to a communication network 12, which in turn is communicably connected to a number of client systems 14. The client systems 14 are shown for purposes of illustration as client systems 14a, 14b, 14c, etc. Each of the client systems 14 includes client software, shown as client software 16a, 16b, and 16c, each of which respectively generates a graphical user interface, shown as user interfaces 18a, 18b, and 18c. Each of the client systems 14 is associated with a user, for example users 20a, 20b and 20c.

The server system(s) 10 is shown including discussion forum server software 22, which provides a number of discussion threads 24, shown for purposes of illustration as including discussion threads 24a, 24b, 24c, etc., to users of the client systems 14 over the communication network 12.

The client systems 14 and server system(s) 10 may each, for example, include one or more processors for program code execution, computer readable program code storage, such as memory, for storing program code executable on the processors. The client systems 14 and server system(s) 10 may further include input/output (I/O) devices and/or interfaces for sending and/or receiving program code and/or data to external computer readable program code storage devices, such as removable storage media, external storage devices, and the like. Similarly, the client systems 14 and server system(s) 10 may further include I/O devices and/or interfaces providing communicable connection to one or more communication networks, such as the communication network 12, which may be embodied as any specific type of computer communication network or networks, such as the Internet, a Local Area Network (LAN), and the like. The client systems 14 and server system(s) 10 may further include any specific type of operating system program code.

During operation of the components shown in FIG. 1, the disclosed system provides user-defined, system-generated, and moderator-promoted tags in association with posts contained in the discussion threads 24, and uses such tags to determine which sub-threads within the discussion threads 24 are potentially off-topic, as further described below.

Figure 2:
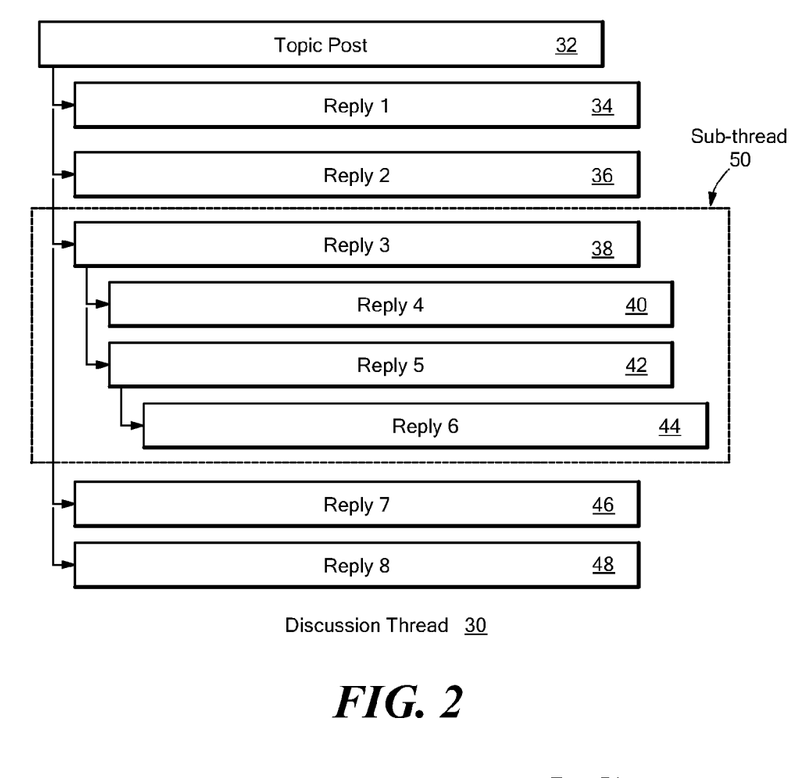
FIG. 2 is block diagram showing the parent-child structure of posts within a discussion thread including a sub-thread.

FIG. 2 is block diagram showing the parent-child structure of posts within a discussion thread 30, including an example sub-thread 50. As shown in FIG. 2, a topic post 32 is the root of a tree of posts, including a number of replies to topic post 32, shown as reply 1 34, reply 2 36, reply 3 38, reply 7 46 and reply 8 48. These replies to topic post 32 are child posts to topic post 32. The replies to topic post 32 are, for example, created when users have clicked on a "REPLY" graphical user interface button or the like visually associated with and/or displayed within the topic post 32.

A reply to a given reply post may, for example, be created when a user clicks on a "REPLY" user interface button or the like visually associated with and/or displayed within the given reply post.

The sub-thread 50 consists of the reply 3 38, reply 4 40, reply 5 42, and reply 6 44. Reply 4 40 and reply 5 42 are replies to reply 3 38, and are accordingly children of reply 3 38. Reply 6 44 is a reply to reply 5 42, and is a child of reply 5 42. As shown in FIG. 2, all posts under the reply 3 38 are contained within the sub-thread 50. The reply 3 38 is considered to be the root or sub-thread topic of the sub-thread 50.

As shown in FIG. 2, a sub-thread of a discussion thread can be defined as any branch of the tree structure of the discussion thread. In other words, a sub-thread can be any set of posts contained under a single post. Accordingly, a sub-thread includes a sub-thread topic that is a post that all other posts in the sub-thread descend from. The sub-thread 50 is just one example of a sub-thread within the discussion thread 30. It should also be noted that the discussion thread 30 is also considered a sub-thread, containing the topic post 32 as the sub-thread topic, and also containing all reply posts shown within the discussion thread 30.

Figure 3:
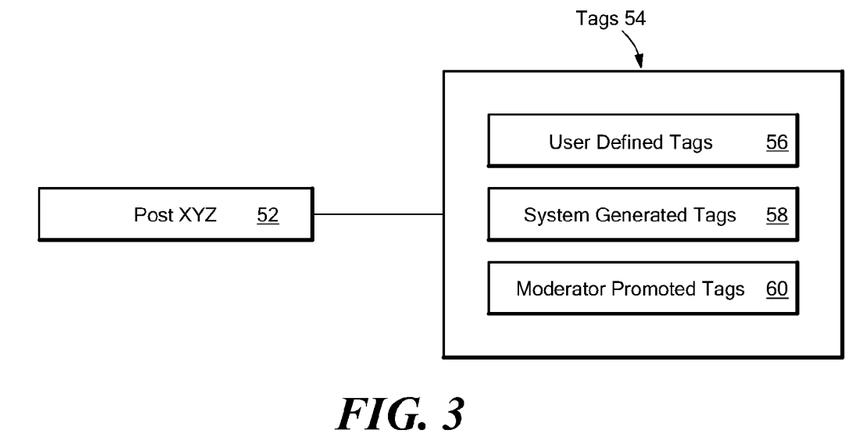
FIG. 3 is a block diagram showing an association between a post in a discussion thread and tags, where the tags include user defined tags, system defined tags, and moderator promoted tags.

FIG. 3 is a block diagram showing an association between a post XYZ 52 in a discussion thread and tags 54. The tags 54 include user defined tags 56, system defined tags 58, and moderator promoted tags 60. For example, the post XYZ 52 may be part of one of the discussion threads 24 shown in FIG. 1. In such an embodiment, the tags 54 may also be stored by the discussion forum server software 22 on the server system(s) 10. Some or all of the tags 54 may be visually represented in the user interface to the discussion threads 24. Visual representations of the tags 54 may or may not include indications of the specific type of each tag, i.e. user defined tag, system defined tag, or moderator promoted tag.

For example, in one embodiment, user defined tags 56 and moderator promoted tags 60 may be visually represented as icons or the like, and displayed within or in visual proximity to the posts they are associated with. In such an embodiment, the system defined tags 58 would initially be visible to a moderator user, but hidden from regular users. The system-generated tags 58 would become visible to regular users if they are promoted to be within the moderator promoted tags 60. Alternatively, all of the tags 54 could be made visible to all users through the user interface. In general, the disclosed system may be embodied such that moderator defined policies, and/or user defined settings can be used to determine which types of tags 54 are made visible to the user and/or moderator through the user interface to the discussion threads 24.

Figure 4:
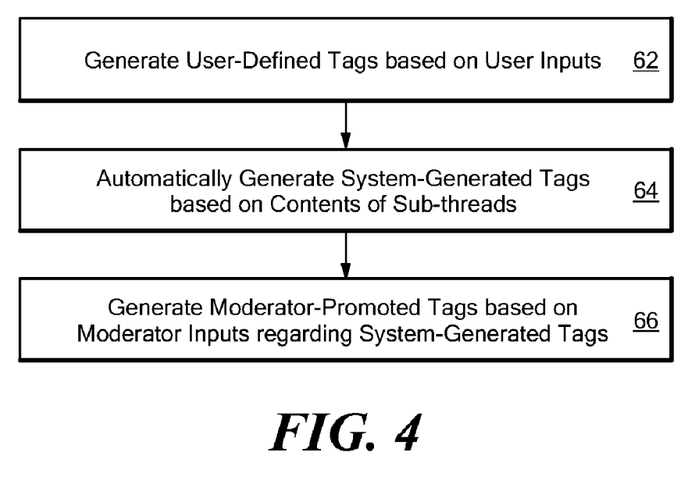
FIG. 4 is a flow chart showing steps performed in an illustrative embodiment to provide tags for one or more posts in a discussion thread.

FIG. 4 is a flow chart showing steps performed in an illustrative embodiment to provide tags for one or more posts in a discussion thread. At step 62, the disclosed system generates user defined tags based on user inputs. For example, in step 62, the user may be provided with user interface components, such as buttons, pull down menu options, etc., that allow the user to indicate they want to define a user defined tag. The user interface then permits the user to enter a text name for the tag into a field provided in the user interface, and the tag is then automatically associated with a current post that the user has previously selected, for example by using the mouse to click on the post. After the user has defined a tag for a post, then that tag may automatically be made available to the user through the user interface for association with other posts. The text name that the user enters for a user defined tag is not limited by the system, and can be made up of any specific text.

In one embodiment, user-defined tags defined by a given user can only be attached by that user to posts made by that user. Accordingly, user-defined tags are associated with individual posts, and apply only to individual posts. In one embodiment, user-defined tags can be defined by a user that initiates a discussion thread, and is accordingly the author of the topic post for that discussion thread. In such an embodiment, the topic author can specify, for example through graphic components of the user interface, a subset of the user-defined tags to be made available to authors of replies in the discussion thread, such that those specified user-defined tags can be attached to individual replies in the discussion in the discussion thread. Alternatively, the disclosed system can be embodied such that a topic author can indicate through the user interface that a more open mode for user-defined tag definition may be used within the discussion thread, in which reply authors can create their own tags to be associated with the posts they author, if they so choose.

At step 64, the disclosed system generates system-generated tags based on the contents of sub-threads in the discussion thread. In contrast to the user-defined tags, which are associated with individual posts, the system-generated tags generated at step 64 for a given sub-thread are based on and associated with the combined contents of all posts contained in that sub-thread. For example, data-mining techniques may be applied across the total contents of the posts contained in a sub-thread to generate the system-generated tags for that sub-thread at step 64. In one embodiment, the disclosed system automatically generates system-generated tags for a sub-thread by data-mining that determines the n most commonly occurring words or pieces of sub-text across all the posts of a sub-thread (excluding common stop words such as "the"). The value n may be any specific number, e.g. 3.

An advantage of data mining across all the contents of each sub-thread is that while many posts are relatively quick composed, short comments, data mining algorithms generally need a somewhat large data source to operate effectively. Since replies to a post can be treated as commentary on the original post, the disclosed system uses the contents of the whole sub-thread as input to the data-mining step.

The disclosed system is not limited to any specific kind of data-mining. For example, alternative embodiments could use more sophisticated data-mining techniques that give more emphasis to words in bold or italics, and so on.

At step 66, the disclosed system generates moderator-promoted tags based on moderator user inputs regarding previously generated system-generated tags. For example, a moderator of a discussion thread may be provided a user interface view in which system-generated tags are visible and also are visibly associated with the specific sub-threads from which they were generated. Accordingly, from examination of such a user interface view, the moderator user can review the system-generated tags, and determine which system-generated tags, if any, should be promoted to moderator-promoted tags. The determination of which system-generated tags to promote to moderator-promoted tags can thus be performed based on the objects of the discussion forum, and on the judgment of the moderator user. For example, in order to allow the moderator-user to promote a system-generated tag to a moderator-promoted tag, the user interface provided to the moderator user may include user interface components, such as graphical buttons, pull-down menu options, and the like, which can be clicked on using the mouse in order to promote a currently selected system-generated tag to a moderator-promoted tag. Any specific user interface technique may be used in this regard, and the present system is not limited to any specific type of user interface construct or component to be used to allow the moderator user to promote a system-generated tag to a moderator-promoted tag.

Those skilled in the art will recognize that the step 62 shown in FIG. 4 can be performed at any point in time, and that the specific order shown in FIG. 4 is given only for purposes of illustration and explanation.

Based on the tags generated in FIG. 4, the disclosed system further determines which sub-threads are "off-topic" when compared to the tag expectations of the topic post for a discussion thread. The disclosed tag types provide three levels of tagging that can be used by discussion thread moderators to maintain the accuracy of sub-thread summarizations, and through which moderators have an efficient way to semantically analyze a voluminous discussion thread without reading through all the actual content. Based on the tags generated in FIG. 4, with or without moderator interaction, off-topic sub-threads can accordingly be moved into separate topics, or rendered in less prominent ways than on-topic sub-threads in the user interface, allowing significant performance advantages as less information needs to be retrieved and rendered at the same time. The overall clutter of the display of a discussion thread can accordingly be reduced, as only relevant posts are contained and/or displayed under a particular subject, and search results become more accurate because content is more cleanly separated according to meaning. Moreover, certain ones of the tags generated in FIG. 4 may be used to contribute to the ranking of content items retrieved through searches having matching keywords.

Figure 5:
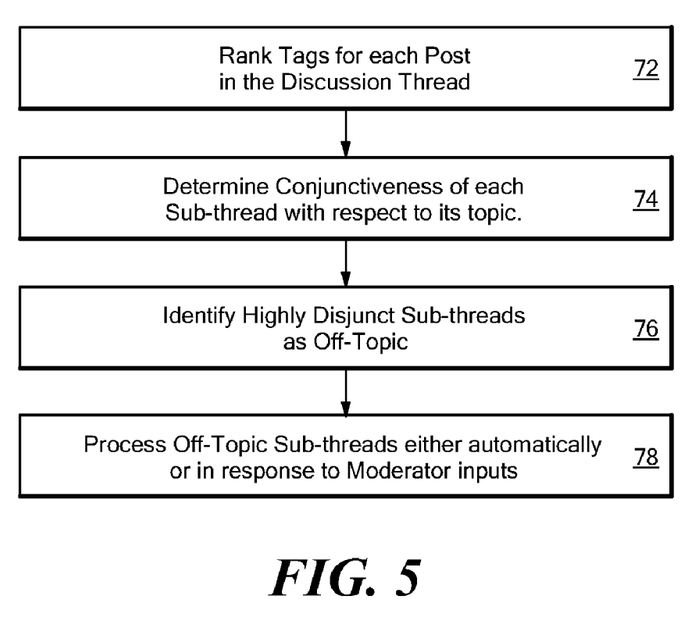
FIG. 5 is a flow chart showing steps performed in an illustrative embodiment to identify and process off-topic sub-threads of a discussion thread.

FIG. 5 is a flow chart showing steps performed in an illustrative embodiment to identify and process off-topic sub-threads of a discussion thread. As shown in FIG. 5, at step 72 the disclosed system ranks the tags associated with each post in the discussion thread. The rankings generated at step 72 may be determined in a way that is consistent with the data-mining approach used to determine the system-generated tags generated in step 64 of FIG. 4. For example, if tag occurrence frequency is used to generate the system-generated tags, then the tag ranking at step 72 may also be based on tag frequency, with more frequently occurring tags being ranked relatively higher than less frequently occurring ones. Accordingly, in such an embodiment, the rankings of the tags for a given post reflect the number of times that each tag occurs in that post and all the posts that descend from that post. Thus the tag rankings for a given post reflect the frequency of use for each tag in the entire sub-thread for which that post is the root or sub-thread topic.

At step 74, the disclosed system determines the conjunctiveness of each sub-thread with regard to its parent. This is accomplished by comparing the tags and their rankings for a reply with those its parent post. The greater the difference between the ranked tags of the reply and those of its parent post, the less conjunctive (or more disjunctive) the sub-thread consisting of the reply and all of its descendants is with regard to its parent post. The degree of disjunctiveness for a given reply is an indication of how much the sub-thread for which that reply is the root is "off-topic" with regard to the subject matter of the parent post to which it is a reply.

In one embodiment, the conjunctiveness of each sub-thread is determined by the following summation formula, applied across the set of tags associated with a reply post that is the root of the sub-thread:

$$\Sigma(K-\text{rank}_t)(K-\text{rank}_R)$$

where $\text{rank}_t$ is the rank of a tag in the tag ordering for the parent post of the reply, $\text{rank}_R$ is the rank of that tag in the tag ordering for reply, K is a predetermined constant.

At step 76, the disclosed system identifies highly disjunctive sub-threads as being "off-topic". For example, if a reply post is determined at step 74 to have a degree of disjunctiveness greater than a threshold level, then that post and any descendants thereof can be identified as an "off-topic" sub-thread at step 76.

At step 78, the disclosed system processes off-topic sub-threads either automatically or in response to moderator inputs. In one embodiment, those sub-threads determined at step 76 to be off-topic are identified to a moderator user through a user interface provided to the discussion thread. The moderator user is then able to remove those sub-threads from the discussion thread based on his or her own judgment regarding their content. For example, the moderator user may act to delete a sub-thread identified as off-topic, or move it to another topic of its own. In one embodiment, when a sub-thread identified as off-topic is removed from a discussion thread, it is replaced by a link (URL or the like) to the new topic. In another exemplary embodiment, the disclosed system operates without moderator action or notification to remove off-topic sub-threads from a discussion thread, either by deleting the off-topic sub-threads or moving them to new topics to which links are left in the original discussion thread.

It should be noted that the disclosed system may be embodied or configured to operate with or without moderator action to remove off-topic sub-threads from a discussion thread. The disclosed process for generating system-generated tags for that discussion thread may be subsequently re-run to take into account the changed data resulting from removal of the off-topic sub-threads.

In response to such off-topic sub-thread removal, and/or resulting re-generation of system-generated tags, in one embodiment, the user interface displayed to the moderator user may provide a visual indication to the moderator user that notifies him or her that a particular thread has been "automatically moderated", and requires his or her attention to modify moderator-promoted tags. The removal of the off-topic sub-thread may constitute the system's deletion of the sub-thread, movement of the sub-thread in a different location, or movement of the sub-thread leaving a descriptive link in the original discussion thread. In all of these cases of moderation, the tags defined in the off-topic sub-thread are effectively removed from the consideration of the data-mining algorithm subsequently run on the original discussion thread to regenerate the system-generated tags.

Figure 6:
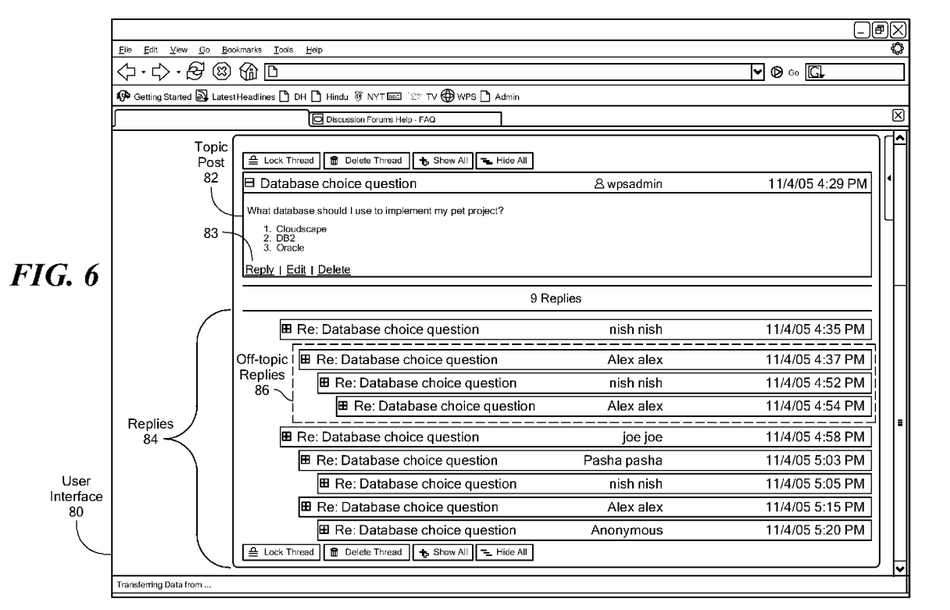
FIG. 6 is a simplified screen shot showing a user interface view of a discussion thread including off-topic and on-topic posts.

FIG. 6 is a simplified screen shot showing a user interface view of a discussion thread including off-topic and on-topic posts. As shown in FIG. 6, a user interface 80 generated by an embodiment of the disclosed system shows a topic post 82 with a number of replies 84. The topic post 82 contains a question regarding which database the author should use, and lists three database options: Cloudspace, DB2 and Oracle. As also shown in FIG. 6, the topic post 82 includes a reply button 83 that enables users reading the topic post 82 to create a reply post to the topic post 82. Also identified in FIG. 6 are off-topic replies 86.

Figure 7:
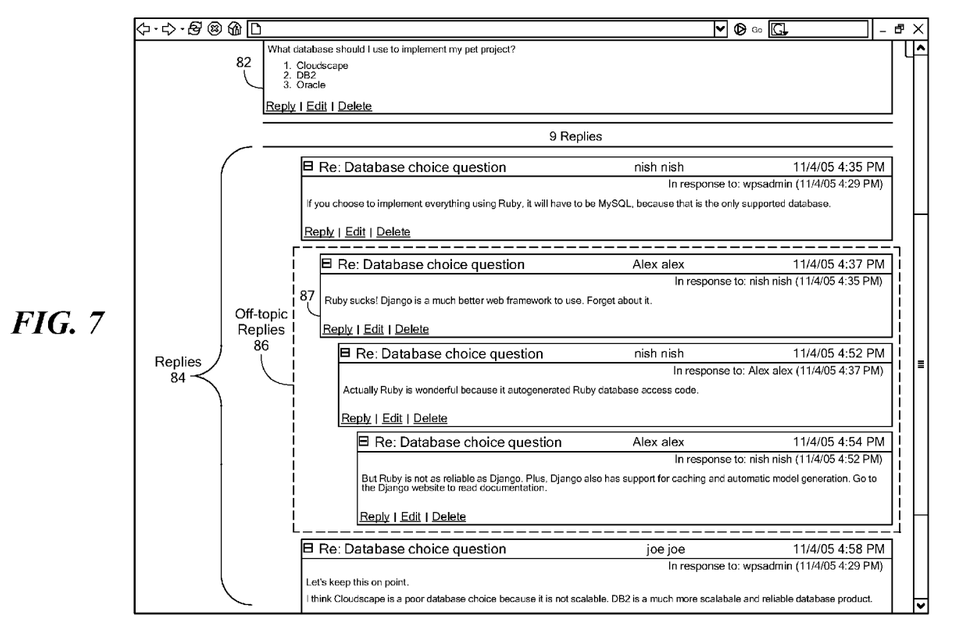
FIG. 7 is a simplified screen shot showing a user interface view of the discussion thread of FIG. 6 but with off-topic posts expanded.

FIG. 7 is a simplified screen shot showing a user interface view of the discussion thread of FIG. 6 but with off-topic posts expanded. As shown in FIG. 7, off-topic replies 86 have been expanded so that their full contents is shown. As is apparent from the contents of the off-topic replies 86, the sub-thread having reply 87 as its topic has become a discussion mostly regarding the Ruby and Django web frameworks, which were not among the options contained in the original topic post 82.

Figure 8:
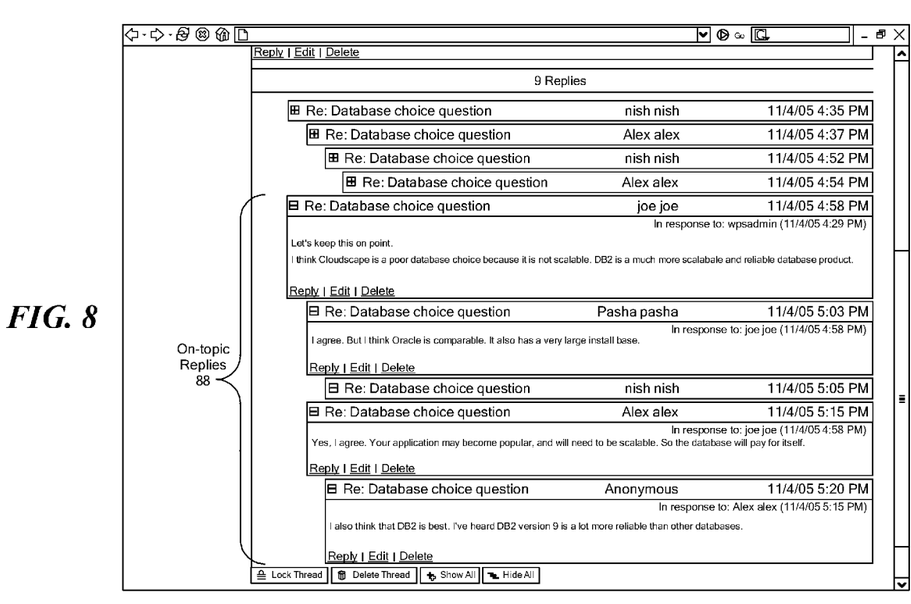
FIG. 8 is a simplified screen shot showing a user interface view of the discussion thread of FIG. 6 but with on-topic posts expanded.

FIG. 8 is a simplified screen shot showing a user interface view of the discussion thread of FIG. 6 but with on-topic posts expanded. As shown in FIG. 8, the on-topic replies 88 have been expanded to show their full contents. As is apparent from the contents of the on-topic replies 88, the discussion that dominates the discussion thread involves Oracle, DB2 and Cloudspace, which were the intended options to be discussed from the original topic post 82 shown in FIGS. 6 and 7.

Using an embodiment of the disclosed system, the off-topic replies 86 of FIGS. 6 and 7 can be identified in response to the system-generated and other tags associated with those posts. Once the off-topic replies 86 are so identified, they can be visually indicated or listed to a moderator user through a graphical user interface to the discussion thread. This would enable the moderator user to remove the off-topic replies 86 from the discussion thread, either by deleting them or moving them to a new topic. The disclosed system may further be embodied to insert a link to such a new topic in the place of the off-topic replies 86 when they are removed from the discussion thread.

Figure 9:
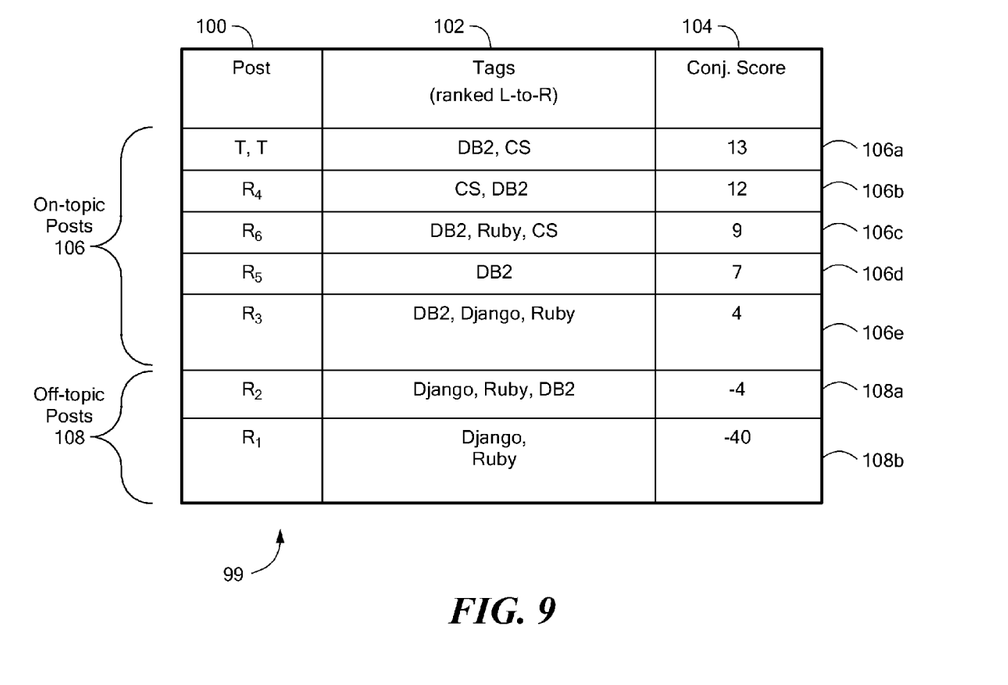
FIG. 9 is a table showing how the disclosed system determines off-topic posts based on the disclosed tags in an illustrative embodiment.

FIG. 9 is a table showing how the disclosed system determines off-topic posts based on the disclosed tags in an illustrative embodiment. The table 99 is shown including a number of entries corresponding to posts in a discussion thread. The contents of column 100 identifies the post represented by the entry, the contents of the column 102 shows the ranked set of tags associated with the post, and the contents of the column 104 shows the conjunctiveness score determined for that post. As shown in the example of FIG. 9, the entry 106a is for a topic post, with which are associated tags DB2 and CS, and which has a conjunctiveness score of 13. Entry 106b is for a reply $R_4$, with which are associated tags CS and DB2, and which has a conjunctiveness score of 12. Entry 106c is for a reply $R_6$, with which are associated tags DB2, Ruby, and CS, and which has a conjunctiveness score of 9. The entry 106d is for reply $R_5$, which has associated with it the tag DB2, and which has a conjunctiveness score of 7. The entry 106e is for reply $R_3$, has tags DB2, Django and Ruby associated with it, and has a conjunctiveness score of 4.

The off-topic posts 108 include post 108a for reply $R_2$, having tags Django, Ruby and DB2 associated with it, and having a conjunctiveness score of −4, and 108b for reply $R_1$, having tags Django and Ruby associated with it, and having a conjunctiveness score of −10. As shown in the table 99, those posts having a conjunctiveness score below a given threshold, for example 0, are determined to be off-topic. Accordingly, the sub-threads for which replies $R_1$ and $R_2$ are topics would be determined to be off-topic.

For example, in an embodiment in which conjunctiveness scores are determined based on the summation formula $\Sigma(K-\text{rank}_t)(K-\text{rank}_R)\ldots$, and where the constant K is equal to 4 (K is selected so that it is one greater than the maximum number of tags in a post, in this example 3), and where if a tag is associated with a reply but not with the parent post, then the value $\text{rank}_t$ is set to one greater than K (i.e. 5), then the following is an example of how the conjunctiveness score for reply $R_6$ would be determined:

$$DB2+CS+\text{Ruby}=>(4-1)(4-1)+(4-2)(4-3)+(4-5)(4-2)=9$$

As shown above the rank of tag DB2 for both the reply $R_6$ and its parent post is 1, the rank of tag CS for reply $R_6$ is 3 but for its parent post is 2, and the rank of tag Ruby for reply $R_6$ is 2, but Ruby is not a tag for its parent post, so the parent post rank for Ruby is set to one greater than K, in this case 5, causing the corresponding ranking factor to become negative. The above ranking system is designed so that highly ranked tags which are common to both the topic and its reply contribute towards a higher conjunctiveness score, and tags which appear only in the topic or the reply will contribute a negative conjunctiveness score.

Those skilled in the art will recognize that the table 99 of FIG. 9 is representative of only one possible embodiment of the disclosed system, and that the disclosed system is not limited to the approach illustrated in FIG. 9. Other techniques may be used instead of the data-mining and tag ranking approaches described above, as may be appropriate for specific uses and/or implementations.

The present invention can be realized in hardware, software, or a combination of hardware and software. A system according to the present invention can be realized in a centralized fashion in one computer system, or in a distributed fashion where different elements are spread across several interconnected computer systems. Any kind of computer system or other apparatus adapted for carrying out the methods described herein is suited. A typical combination of hardware and software could be a general purpose computer system with a computer program that, when being loaded and executed, controls the computer system such that it carries out the methods described herein.

The figures include block diagram and flowchart illustrations of methods, apparatus(s) and computer program products according to an embodiment of the invention. It will be understood that each block in such figures, and combinations of these blocks, can be implemented by computer program instructions. These computer program instructions may be loaded onto a computer or other programmable data processing apparatus to produce a machine, such that the instructions which execute on the computer or other programmable data processing apparatus create means for implementing the functions specified in the block or blocks. These computer program instructions may also be stored in a computer-readable medium or memory that can direct a computer or other programmable data processing apparatus to function in a particular manner, such that the instructions stored in the computer-readable medium or memory produce an article of manufacture including instruction means which implement the function specified in the block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the block or blocks.

Those skilled in the art should readily appreciate that programs defining the functions of the present invention can be delivered to a computer in many forms; including, but not limited to: (a) information permanently stored on non-writable storage media (e.g. read only memory devices within a computer such as ROM or CD-ROM disks readable by a computer I/O attachment); (b) information alterably stored on writable storage media (e.g. floppy disks and hard drives); or (c) information conveyed to a computer through communication media for example using wireless, baseband signaling or broadband signaling techniques, including carrier wave signaling techniques, such as over computer or telephone networks via a modem.

While the invention is described through the above exemplary embodiments, it will be understood by those of ordinary skill in the art that modification to and variation of the illustrated embodiments may be made without departing from the inventive concepts herein disclosed.

We claim:

1. A computer-implemented method of discussion thread management performed by a computer system having at least one processor, comprising:
   enabling users to define user-defined tags and to associate said user defined tags with posts in a discussion thread;
   automatically generating system-generated tags, wherein said system-generated tags are determined by analyzing the contents of all posts in a sub-thread of said discussion thread, wherein said sub-thread is made up of a selected post in said discussion thread that is a root post of said sub-thread, posts that are replies to said root post of said sub-thread, and all posts contained in any other sub-threads having root posts located under said root post of said sub-thread;
   associating said system-generated tags with said selected post;
   enabling a moderator user to promote a number of said system-generated tags to moderator-promoted tags; and
   determining, responsive to said user-defined tags, said system-generated tags, and said moderator-promoted tags, whether said sub-thread is off-topic with respect to said discussion thread.

2. The method of claim 1, further comprising:
   in the event said sub-thread is determined to be off-topic with respect to said discussion thread, moving said sub-thread to a new discussion thread.

3. The method of claim 2, further comprising:
   inserting a link to said new discussion thread at the former position of said sub-thread in said discussion thread.

4. The method of claim 1, further comprising:
   in the event said sub-thread is determined to be off-topic with respect to said discussion thread, notifying said moderator user that said sub-thread has been determined to be off-topic, and enabling said moderator user to indicate that said sub-thread is to be moved to a new discussion thread.

5. The method of claim 4, further comprising:
   in the event said sub-thread is determined to be off-topic with respect to said discussion thread, enabling said moderator user to indicate that said sub-thread is to be deleted.

6. The method of claim 1, wherein said determining whether said sub-thread is off-topic comprises:
   determining tag rankings of said user-defined tags, said system-generated tags, and said moderator-promoted tags;
   determining a conjunctiveness score of said selected post with respect to its parent topic post in said discussion thread responsive to tags associated with said selected post, said parent topic post and said tag rankings; and
   determining that said sub-thread is off-topic in the event that said conjunctiveness score is below a predetermined threshold.

7. The method of claim 6, wherein said determining said tag rankings is responsive to frequency of use of said tags in said parent topic post.

8. A system including a non-signal computer readable storage medium, said computer readable storage medium having program code stored thereon for discussion thread management, said program code comprising:
   program code for enabling users to define user-defined tags and to associate said user defined tags with posts in a discussion thread;
   program code for automatically generating system-generated tags, wherein said system generated tags are determined by analyzing the contents of all posts in a sub-thread of said discussion thread, wherein said sub-thread is made up of a selected post in said discussion thread that is a root post of said sub-thread, posts that are replies to said root post of said sub-thread, and all posts contained in any other sub-threads having root posts located under said root post of said sub-thread;
   program code for associating said system-generated tags with said selected post;
   program code for enabling a moderator user to promote a number of said system generated tags to moderator-promoted tags; and
   program code for determining, responsive to said user-defined tags, said system generated tags, and said moderator-promoted tags, whether said sub-thread is off-topic with respect to said discussion thread.

9. The system of claim 8, said program code further comprising:
   program code for, in the event said sub-thread is determined to be off-topic with respect to said discussion thread, moving said sub-thread to a new discussion thread.

10. The system of claim 9, said program code further comprising:
    program code for inserting a link to said new discussion thread at the former position of said sub-thread in said discussion thread.

11. The system of claim 8, said program code further comprising:
    program code for, in the event said sub-thread is determined to be off-topic with respect to said discussion thread, notifying said moderator user that said sub-thread has been determined to be off-topic, and enabling said moderator user to indicate that said sub-thread is to be moved to a new discussion thread.

12. The system of claim 11, said program code further comprising:
    program code for, in the event said sub-thread is determined to be off-topic with respect to said discussion thread, enabling said moderator user to indicate that said sub-thread is to be deleted.

13. The system of claim 8, wherein said program code for determining whether said sub-thread is off-topic comprises:
    program code for determining tag rankings of said user-defined tags, said system generated tags, and said moderator-promoted tags;
    program code for determining a conjunctiveness score of said selected post with respect to its parent topic post in said discussion thread responsive to tags associated with said selected post, said parent topic post and said tag rankings; and
    program code for determining that said sub-thread is off-topic in the event that said conjunctiveness score is below a predetermined threshold.

14. The system of claim 13, wherein said program code for determining said tag rankings is responsive to frequency of use of said tags in said parent topic post.

15. A computer program product including a non-signal computer readable storage medium, said computer readable storage medium having program code stored thereon for discussion thread management, said program code comprising:
program code for enabling users to define user-defined tags and to associate said user defined tags with posts in a discussion thread;

program code for automatically generating system-generated tags, wherein said system generated tags are determined by analyzing the contents of all posts in a sub-thread of said discussion thread, wherein said sub-thread is made up of a selected post in said discussion thread that is a root post of said sub-thread, posts that are replies to said root post of said sub-thread, and all posts contained in any other sub-threads having root posts located under said root post of said sub-thread;

program code for associating said system-generated tags with said selected post;

program code for enabling a moderator user to promote a number of said system generated tags to moderator-promoted tags; and program code for determining, responsive to said user-defined tags, said system generated tags, and said moderator-promoted tags, whether said sub-thread is off-topic with respect to said discussion thread.

\* \* \* \* \*